US008287613B2

(12) United States Patent
Chen et al.

(10) Patent No.: US 8,287,613 B2
(45) Date of Patent: Oct. 16, 2012

(54) GAS-SOLIDS SEPARATOR

(75) Inventors: Ye-Mon Chen, Sugar Land, TX (US); Hubertus Wilhelmus Albertus Dries, Amsterdam (NL); Kee-Khoon Foo, Amsterdam (NL)

(73) Assignee: Shell Oil Company, Houston, TX (US)

( * ) Notice: Subject to any disclaimer, the term of this patent is extended or adjusted under 35 U.S.C. 154(b) by 386 days.

(21) Appl. No.: 12/601,473

(22) PCT Filed: May 27, 2008

(86) PCT No.: PCT/EP2008/056501
§ 371 (c)(1),
(2), (4) Date: Mar. 29, 2010

(87) PCT Pub. No.: WO2008/145657
PCT Pub. Date: Dec. 4, 2008

(65) Prior Publication Data

US 2010/0212274 A1 Aug. 26, 2010

(30) Foreign Application Priority Data

Jun. 1, 2007 (EP) .................................... 07109443

(51) Int. Cl.
*B01D 45/08* (2006.01)

(52) U.S. Cl. ............ 55/456; 55/459.1; 55/461; 55/343; 55/345; 55/346; 55/348; 55/394; 55/424; 55/426; 55/425; 422/147; 422/144; 95/269; 95/271; 210/512.1; 210/304; 208/113; 208/161

(58) Field of Classification Search .................... 55/456, 55/459.1, 461, 343, 345, 346, 348, 394; 422/147, 422/144; 95/269, 271; 208/113, 161; 210/512.1, 210/304
See application file for complete search history.

(56) References Cited

U.S. PATENT DOCUMENTS

| | | | | |
|---|---|---|---|---|
| 1,753,502 | A * | 4/1930 | Clark | 55/340 |
| 2,582,423 | A | 1/1952 | Foley | 183/80 |
| 2,667,944 | A | 2/1954 | Crites | 183/81 |
| 2,936,043 | A | 5/1960 | Armstrong et al. | 183/92 |
| 3,401,124 | A | 9/1968 | Goulden | 252/417 |
| 3,426,513 | A * | 2/1969 | Bauer | 55/459.1 |

(Continued)

FOREIGN PATENT DOCUMENTS

| | | |
|---|---|---|
| EP | 52042 | 5/1982 |

(Continued)

OTHER PUBLICATIONS

Hydrogen Processing, Jan. 1985, pp. 51-54.

*Primary Examiner* — Jason M Greene
*Assistant Examiner* — Dung H Bui
(74) *Attorney, Agent, or Firm* — Charles W. Stewart

(57) ABSTRACT

Gas-solids separator comprises a tubular housing, an inlet for introducing a gas-solids mixture at one end of said housing, which inlet is executed such that it imparts a swirl to the gas-solids mixture, a solids outlet opening at the opposite end of said housing, and a co-axially positioned tubular gas outlet conduit placed at an end of said housing, which separator further comprises a vortex stabilizer, comprising a pin placed on a stabilizing plate, in which separator the pin runs along the axis of the tubular housing and in which a passageway is provided through the stabilizer plate and the pin.

16 Claims, 2 Drawing Sheets

U.S. PATENT DOCUMENTS

| | | | | |
|---|---|---|---|---|
| 3,541,766 | A | 11/1970 | Wilson | 55/348 |
| 3,590,558 | A | 7/1971 | Fernandes | 55/338 |
| 3,675,401 | A | 7/1972 | Cordes | 55/394 |
| 3,802,570 | A | 4/1974 | Dehne | 210/304 |
| 3,822,533 | A * | 7/1974 | Oranje | 55/394 |
| 3,940,331 | A | 2/1976 | Rastatter | 209/211 |
| 4,072,481 | A | 2/1978 | Laval, Jr. | 55/177 |
| 4,162,904 | A * | 7/1979 | Clay et al. | 96/381 |
| 4,221,577 | A * | 9/1980 | Lowrie | 55/392 |
| 4,795,561 | A | 1/1989 | Aslin | 210/512.1 |
| 4,810,264 | A | 3/1989 | Dewitz | 48/210 |
| 4,853,003 | A | 8/1989 | Dewitz | 55/20 |
| 4,863,500 | A | 9/1989 | Rombout et al. | 55/348 |
| 5,328,592 | A | 7/1994 | Hedrick | 208/113 |
| 5,372,707 | A | 12/1994 | Buchanan et al. | 208/161 |
| 5,514,271 | A | 5/1996 | Buchanan et al. | 203/113 |
| 5,538,696 | A | 7/1996 | Raterman et al. | 422/147 |
| 5,681,450 | A | 10/1997 | Chitnis et al. | 208/113 |
| 5,690,709 | A | 11/1997 | Barnes | 55/348 |
| 6,174,339 | B1 * | 1/2001 | Varady | 55/348 |
| 6,475,256 | B2 * | 11/2002 | Matsubara et al. | 55/337 |
| 6,551,565 | B2 | 4/2003 | Confuorto et al. | 423/239.1 |
| 6,827,753 | B2 * | 12/2004 | Matsubara et al. | 55/417 |
| 6,830,734 | B1 * | 12/2004 | Dirkse et al. | 422/144 |
| 6,902,593 | B2 * | 6/2005 | Miller et al. | 55/338 |
| 7,160,518 | B2 * | 1/2007 | Chen et al. | 422/147 |
| 7,410,527 | B2 * | 8/2008 | Wagner et al. | 95/271 |
| 7,547,337 | B2 * | 6/2009 | Oh et al. | 55/345 |
| 7,662,198 | B2 * | 2/2010 | Jansen et al. | 55/337 |
| 7,780,753 | B2 * | 8/2010 | Lang | 55/337 |
| 7,811,345 | B2 * | 10/2010 | Conrad | 55/343 |
| 7,811,349 | B2 * | 10/2010 | Nguyen | 55/426 |
| 2003/0106292 | A1 * | 6/2003 | Kitano et al. | 55/396 |
| 2008/0115469 | A1 * | 5/2008 | Lane et al. | 55/337 |
| 2009/0152204 | A1 * | 6/2009 | Chantrel et al. | 210/718 |
| 2009/0158932 | A1 * | 6/2009 | Arnold | 95/271 |
| 2010/0043365 | A1 * | 2/2010 | Fujiyama et al. | 55/426 |

FOREIGN PATENT DOCUMENTS

| | | | |
|---|---|---|---|
| EP | 90335 | | 10/1983 |
| EP | 90335 | A2 * | 10/1983 |
| EP | 360360 | | 3/1990 |
| FR | 2000597 | | 9/1969 |
| GB | 1411136 | | 10/1975 |
| WO | WO2004009244 | | 1/2004 |

* cited by examiner

GAS-SOLIDS SEPARATOR

PRIORITY CLAIM

The present application claims priority of European Patent Application No. 07109443.7 filed 1 Jun. 2007.

FIELD OF THE INVENTION

Background of the Invention

The present invention relates to a gas-solids separator comprising a tubular housing, an inlet for introducing a gas-solids mixture at one end of said housing, which inlet is executed such that it imparts a swirl to the gas-solids mixture, a solids outlet opening at the opposite end of said housing, and a co-axially positioned tubular gas outlet conduit placed at an end of said housing, which separator further comprises a vortex stabiliser, comprising a pin placed on a stabilising plate.

The invention relates to a gas-solids separator.

Such a separator is known from EP-A 360360. This patent application discloses a swirl tube separator wherein the vortex stabiliser is arranged in the tubular housing to support a vortex which terminates on the plate on which the pin has been attached.

According to the teachings of WO-A 2004/009244 pins can be extended along the axis of the tubular housing to improve the stability of the vortex. The specification discloses pins that extend from 20% to 100% of the axis. It is even disclosed that the pin extends to a position inside the gas outlet conduit.

The separators according to the above patent applications can be used in fluid catalytic cracking (FCC) processes. In such processes a hydrocarbon feedstock is brought into contact with a hot cracking catalyst in a riser. The feed is cracked into lower boiling products, such as gas, LPG, gasoline, and cycle oils. Furthermore, coke and non-volatile products deposit on the catalyst resulting in spent catalyst. The riser exits into a separator wherein the spent catalyst is separated from the reaction products. In the next step the spent catalyst is stripped, usually with steam, to remove the non-volatile hydrocarbon products from the catalyst. The stripped catalyst is passed to a regenerator in which coke and remaining hydrocarbon materials are combusted and wherein the catalyst is heated to a temperature required for the cracking reactions. Hereafter the hot regenerated catalyst is returned to the riser reactor zone. During regeneration flue gases are produced that contain catalyst particles.

FCC regenerators are generally equipped with separators providing gas-solids separation in one or several stages. The separators according to the above-mentioned patent applications can be used in so-called third stage separators (TSS) to remove fine catalyst particles entrained with the gas streams in previous separation stages. A TSS may consist of a vessel, which contains numerous swirl tube separators. These separators are axial flow cyclones. Flue gas entering the separator tube passes through swirl vanes, which impart a spinning motion to the gas flow. The resulting forces move the catalyst particles to the tube wall where they are separated from the gas stream. The separated particles fall through the bottom of the tubes and are collected in the conical bottom of the separator vessel. The separated particles are discharged from the vessel together with a small quantity of the flue gas. This particles-rich flow is also referred to as the TSS underflow.

SUMMARY OF THE INVENTION

It has now been found that the amount of flue gas that is present in the TSS underflow can advantageously be reduced via the vortex stabiliser.

Accordingly, the present invention provides a gas-solids separator comprising a tubular housing, an inlet for introducing a gas-solids mixture at one end of said housing, which inlet is executed such that it imparts a swirl to the gas-solids mixture, a solids outlet opening at the opposite end of said housing, and a co-axially positioned tubular gas outlet conduit placed at an end of said housing, which separator further comprises a vortex stabiliser, comprising a pin placed on a stabilising plate, in which separator the pin runs along the axis of the tubular housing and in which a passageway is provided through the stabiliser plate and the pin.

It has been found that the gas in the region immediately underneath the stabiliser plate is virtually free from solids. By the provision of a passageway through the stabiliser plate and the pin of the vortex stabiliser the clean gas can efficiently be removed via this passageway from the system. This may have the advantage that no further degassing of the solids is required. In an FCC process it has become customary to degas the solids from the TSS in a so-called fourth-stage separator. The present invention opens the possibility to do away with the necessity for installing a fourth-stage separator.

It will be evident to the skilled person that the separator of this invention can also be used in other applications. The advantages of an improved vortex, and the efficient separation of gas from solids can be achieved in other fields of technology, such as in coal-fired power plants, coal gasification plants, metal ore plants etc.

BRIEF DESCRIPTION OF THE DRAWINGS

The invention will be further illustrated by means of FIGS. 1-3.

DETAILED DESCRIPTION OF THE INVENTION

Figure 1:
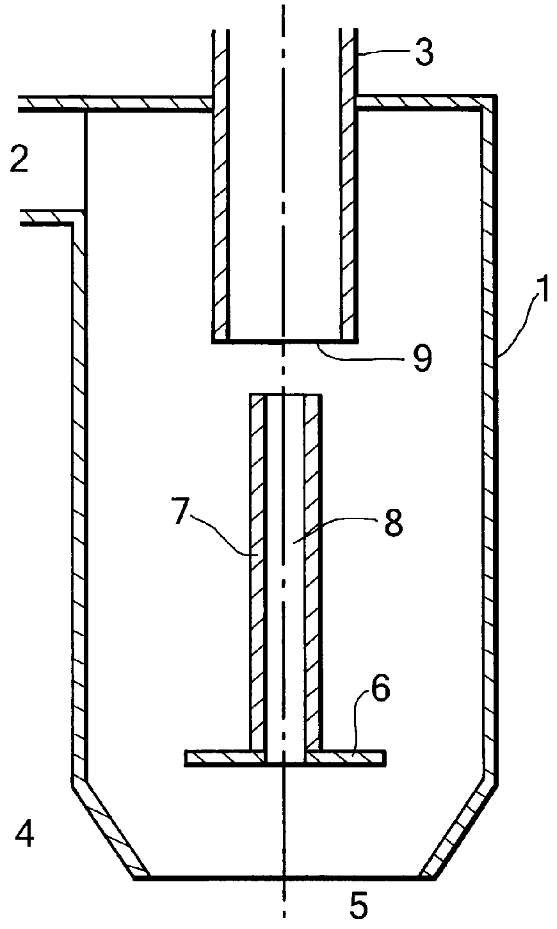
FIG. 1 discloses an embodiment of the present separator wherein the introduction of the gas-solids mixture is effected by means of a tangential inlet.

The separator of the invention works better as the pin extends longer along the axis of the housing. Therefore, the pin is suitably present along at least 20%, preferably from 30 to 100%, more preferably from 80 to 100%, of the axis of the tubular housing, said axis being defined as running from the inlet opening of the gas outlet conduit up to the stabiliser plate. Since it is most convenient if the clean gas that is separated from underneath the stabiliser plate is not brought into contact with solids-laden gas, it is most preferred that the pin extends from the stabiliser plate to beyond the inlet of the gas outlet conduit, i.e. the pin extends to within the gas outlet conduit or may even be longer than the gas outlet conduit.

In such case the pin is preferably fixed within the gas outlet conduit by means of supporting means. Said supporting means are preferably swirl means, such as a vane-body, which swirl means are positioned such that they decrease the swirling motion of the gas being discharged via the gas outlet conduit. Optionally, the pin is also fixed in the tubular housing. Fixation is preferably performed by means of a vane-body placed in the gas outlet conduit. This vane body will, in use, convert the swirling motion of the gas being discharged from the tubular housing in the gas outlet conduit into a pressure increase downstream of the vane body. Thus a separator provided with such a vane body will have a reduced pressure drop.

In order to control the amount of gas that flows through the passageway the inner diameter of the passageway does not need to be uniform. The inner diameter of the passageway may contain a restriction to ensure that the desired flow of gas is allowed to pass through it. When a restriction is provided such a restriction can be provided at any position in the passageway. However, it is preferably provided at the entrance of the passageway, i.e., at the stabilising plate. In that way the amount of clean gas is controlled at the start, whereas the flow through the remainder of the passageway does not provide any hindrances. The nature of the restriction can be selected in accordance with the inner diameter of the remainder of the passageway and with the desired flow of gas through the passageway. Preferably the restriction is provided by a smaller diameter ranging from 95 to 75 percent of the largest inner diameter of the passageway. The passageway is suitably construed such that 11 to 3% of the gas that flows into the separator is passed through the vortex stabiliser The separators according to EP-A 360360 and WO-A 2004/009244 are both swirl tube separators. That implies that the gas inlet is coaxial to the tubular housing. To impart a swirl to the gas-solids mixture the separator is provided with swirl imparting means, such as vanes, extending from the exterior of the gas inlet tube to the wall of the tubular housing. In third-stage separators that are used in FCC processes it is common to apply a multitude of swirl tube separators. Hence, for such use the application of swirl tubes separators is immediately evident. However, it is possible to use the separators of the invention in other applications. Therefore, the separators of the present invention are not limited to swirl tube separators. Suitably, the separator according to the present invention is one wherein the inlet for introducing the gas-solids mixture is arranged tangentially to the tubular housing. In this way the separator is a tangential cyclone separator. The tangential introduction of the gas-solids mixture will impart a swirl to the mixture. The vortex that emerges from such swirl is stabilised by the pin and the stabiliser plate. Alternatively, the separator according to the present invention can be engineered as a swirl tube separator wherein the inlet for introducing the gas-solids mixture is arranged co-axially in the tubular housing and has been provided with swirl-imparting means. Suitable swirl imparting means are vanes.

The vortex stabiliser is positioned in the vicinity of the solids outlet. Preferably, the stabiliser plate is arranged within the tubular housing of the separator. The stabiliser plate suitably is positioned at a distance from the solids outlet opening, said distance stretching from 5 to 25% of the length of the tubular housing, the length being defined as the distance between the solids outlet opening and the inlet opening of the gas outlet conduit. The stabiliser plate is suitably arranged perpendicular to the longitudinal axis of the tubular housing. Its shape is preferably that of a disc.

As indicated above, the present separators can be advantageously used in an FCC process, in particular in a so-called Third-Stage Separator (TSS). In such embodiment the TSS comprises a multitude of separators according to the present invention. Embodiments of TSS units have been described in WO-A 2004/009244 and U.S. Pat. No. 6,174,339. Accordingly, the present invention further provides a separating device comprising a vessel, a general gas inlet, a general gas outlet and a general solids outlet, wherein the vessel has been provided with an upper tube sheet and a lower tube sheet, the two tube sheets defining an upper space in fluid communication with the general gas outlet, a gas-tight middle space in fluid communication with the general gas inlet and a lower space in fluid communication with the general solids outlet, wherein a multitude of separators each having a gas inlet, a gas outlet and a solids outlet, has been arranged such that the gas inlets of the separators are in fluid communication with the middle space, the solids outlets of the separators are in fluid communication with the lower space, and the gas outlets of the separators are in fluid communication with the upper space, in which separating device the separators are the separators according to the present invention. Preferably, the separators are of the type that comprises an inlet for introducing a gas-solids mixture arranged co-axially in the tubular housing of the separator and provided with swirl-imparting means.

The gas inlets of the separators are in fluid communication with the middle space between the tube sheets, which in its turn is in fluid communication with the general gas inlet of the third stage separator. The gas will comprise solids, such as catalyst particles. The solids outlets of the separators are in fluid communication with the lower space, being a solids-collecting space in the lower part of the vessel, also called the catch chamber. The catch chamber is provided with the solids outlet. The gas outlet conduit of each separator is in fluid communication with a clean gas collecting space, i.e. the upper space, which is in its turn in fluid communication with the general gas outlet of the third stage separator.

The separators in such a separating device may contain pins that debouch into a space different from the upper space. One space into which some or all pins may debouch is the general gas outlet. In that way the flow of gas through the passageways in the pins are favoured. Another suitable option is to provide the separating device with a fourth space into which pins debouch. In this way the cleanliness of the gas that flows through the passageways and that is collected in this fourth space can be assessed and dependent on the content of solids in the gas the skilled person may decide to discharge the gas collected in this fourth space together with the gas through the general gas outlet. Alternatively, the skilled person may decide to subject the gas from this fourth space to a further gas-solids separation, e.g. filtration, flotation or a further centrifugal separation. The fourth space can be provided in the separating device, e.g., as a space between the upper and middle spaces or a space above the upper space. The fourth space may also be arranged outside of the vessel of the separating device. The fourth space suitably has a gas outlet in fluid communication with the general gas outlet of the separating device or has a separate gas outlet.

The number of separators present in a third stage separator will depend on the flow rate of the feed. Typically between 1 and 200 separators are present in one vessel.

The separator according to the invention and the separating device comprising a multitude of such separators may suitably be used for various types of gas-solid separations. Especially when a low emission of solids per volume is required the separator may advantageously be used. The separator according to the invention is advantageously used to separate solids having a diameter ranging between $1*10^{-6}$ m and $40*10^{-6}$ m from a gas stream. The gas stream usually has a solids content of between 100 and 500 mg/Nm$^3$. The cleaned gas leaving the improved separator can have emission levels of below 50 mg/Nm$^3$ and even below 30 mg/Nm$^3$.

Accordingly, the present invention further provides a process to separate solids from a gas-solids mixture by passing the gas-solids mixture through a separator or a separating device comprising a multitude of such separators according to the invention. The process is suitably used in processes wherein in the gas-solids mixture has a solids content from 100 to 500 mg/$Nm^3$ to obtain a gaseous stream containing less than 50 mg solids per $Nm^3$.

In FCC process operations many refiners use high efficiency TSS devices to decrease loss of FCC catalyst particles. Even in such cases it is not uncommon to use a fourth stage separator to clean up the underflow (solids rich portion) discharged from TSS device. Solids separated in the TSS are transported to the fourth stage separator using a small amount of gas as the means for transportation of the catalyst particles, which is controlled by a nozzle normally located downstream of the fourth stage separator. The equipment used for treatment of TSS underflow would normally be a fourth stage cyclone or a ceramic filter designed for high temperature. A fourth stage cyclone typically does not remove all of the catalyst particles from the TSS underflow resulting in an ultimate catalyst emission. The ceramic filter does remove essentially 100% of the catalyst, but the cost and reliability for continuous operation make it less attractive in many cases. The ceramic filter tends to be a piece of equipment that is prone to shutdowns.

The present process has the advantage that through the stabilizer plate and pin so much gas is withdrawn that one may forfeit the use of a fourth stage separator. The solids that are separated in the separation device according to the invention may be just collected and discharged. Accordingly, the present invention provides a process to separate solids from a gas-solids mixture, in particular to separate catalyst particles from a flue gas in a FCC process, by passing the gas-solids mixture through a separating device as described above, obtaining clean gas and separated solids, and discharging the separated solids. Suitably the separated solids are collected in a solids hopper before discharging. Further, especially in the case of FCC catalyst particles, the separated solids may be purged by an inert gas in the solids hopper before discharging. In these cases the solids are not subjected to any further gas-solids separation step.

FIG. 1 shows a separator comprising a tubular housing 1. A gas-solids inlet 2 has been arranged such that the gas-solids mixture is fed into the housing 1 tangentially, thereby imparting a swirl to the mixture.

The vessel is further provided with a gas outlet conduit 3, a frusto-conical part 4 and a solids outlet 5. The mixture swirls around a vortex stabiliser that comprises a stabilising plate 6 and a pin 7. The vortex in the tubular housing is stable around the pin. Solids that are separated due to the centrifugal force are discharged from the housing via the solids opening 5. Some gas is entrained with the solids. In the area underneath the stabilising plate the gas is virtually free from solids. Via a passageway 8 through the stabilising plate and the pin such gas can be discharged, together with gas that is cleaned via the centrifugal force, through a gas inlet opening 9 via the gas outlet conduit 3. The pin, the gas outlet conduit and the housing are all coaxial. The figure is does not show the right scale; for clarity's sake the pin and stabiliser plate are expressed bigger than in use. However, the figure correctly indicates that the pin extends for about 85% along the axis, as defined from the inlet opening 9 to the stabilising plate 6, i.e., the end of the passageway 8.

Figure 2:
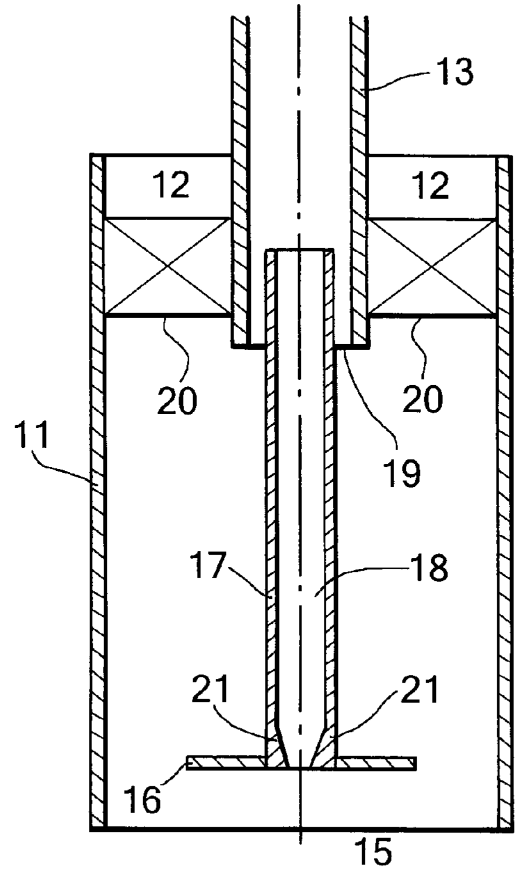
FIG. 2 discloses a separator according to the present invention with an inlet for introducing a gas-solids mixture arranged co-axially in the tubular housing of the separator and provided with swirl imparting means.

FIG. 2 shows a different type of separator. This separator comprises a tubular housing 11 and a co-axial gas outlet conduit 13. Via the annulus 12, defined between the tubular housing 11 and the gas outlet conduit 13, a gas-solids mixture can be introduced into the separator. A swirl will be imparted to the gas-solids mixture via vanes 20. The swirl develops into a stable vortex around a vortex stabiliser, comprising a stabilising plate 16 and a pin 17. The pin extends through the inlet opening 19 of the outlet conduit 13 into the outlet conduit 13. The pin and stabilising plate have been provided with a passageway 18. At the end of the pin a restriction 21 has been provided. Gas that is freed from solids is passed through the restriction 21 and the passageway 18 and eventually discharged via the gas outlet conduit 13. Solids separated are withdrawn from the tubular housing 11 via solids outlet opening 15.

Figure 3:
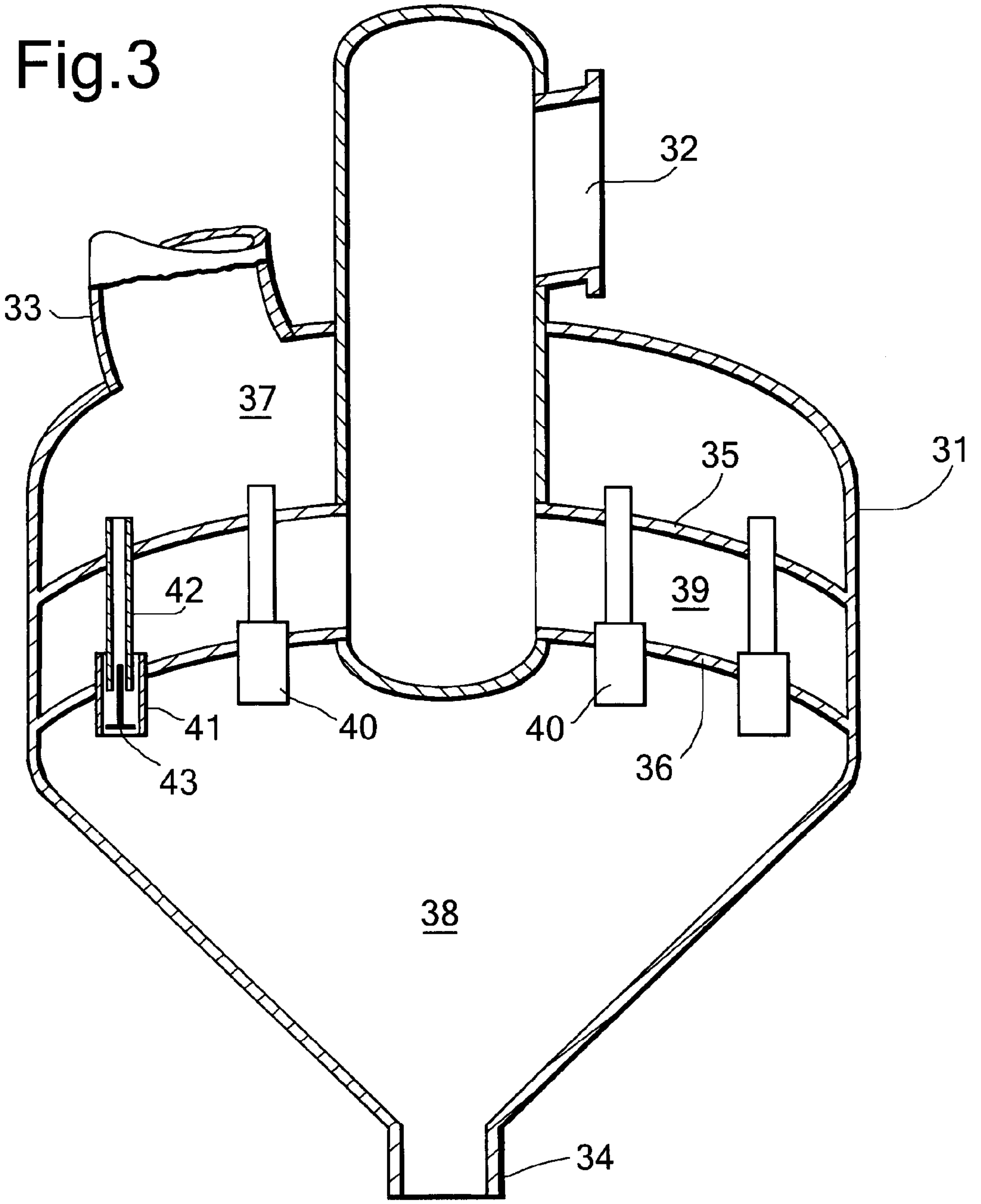
FIG. 3 shows a separating device provided with a number of the separators according to the present invention.

FIG. 3 shows schematically a third-stage separator. The separating device comprises a vessel 31, a general gas inlet 32, a general gas outlet 33 and a general solids outlet 34. The vessel further comprises an upper tube sheet 35 and a lower tube sheet 36. The tube sheets define three spaces; an upper space 37 which communicates with general gas outlet 33, a lower space 38 that communicates with the general solids outlet 34 and a middle space 39 communicating with the general gas inlet 32. Between the tube sheets 35 and 36 a multitude (in the figure four) separators 40 are arranged. Each separator comprises a tubular housing 41, a coaxial gas outlet conduit 42 and a vortex stabiliser 43, comprising a pin and a stabilising plate. The inlet of the separator is constituted by the annular opening defined between the gas outlet conduit 42 and the tubular housing 41. A solids-laden gas mixture entering via general gas inlet 32 is distributed in space 39. Via the annular inlet openings of the separators 40 the gas is passed through the separators. Swirl imparting means in the annular openings (not shown) cause a swirl to the gas, thereby provoking separation between gas and solids. The swirl is stabilised via the vortex stabiliser 43 and solids separated leave the separators and drop into space 38 for withdrawal via general solids outlet 34. Gas that is freed from solids leaves the separators 40 via the gas outlet conduits 42. Since a passageway has been provided through the vortex stabiliser 43, gas that has been entrained with the solids can join the gas freed from solids and also be withdrawn via gas outlet conduits 42. The cleaned gases are collected in space 37 and withdrawn from the vessel 31 via general gas outlet 33.

The invention claimed is:

1. A gas-solids separator comprising: a tubular housing; an inlet for introducing a gas-solids mixture at one end of said housing, which inlet is executed such that it imparts a swirl to the gas-solids mixture; a solids outlet opening at the opposite end of said housing; and a co-axially positioned tubular gas outlet conduit having a gas outlet conduit inlet end and extending through an end of said housing with the gas outlet conduit inlet end terminating within a separator zone defined by the tubular housing; vortex stabiliser, comprising a pin placed on a stabilising plate, residing within the separator zone wherein the pin runs along an axis of the tubular housing and defines a passageway through the stabiliser plate and the pin.

2. A gas-solids separator according to claim 1, wherein the pin is present along at least 20% of the axis of the tubular housing, said axis running from the gas outlet conduit inlet end of the gas outlet conduit up to the stabiliser plate.

3. A gas-solids separator according to claim 2, wherein the pin is present along at from 30 to 100% of the axis of the tubular housing.

4. A gas-solids separator according to claim 2, wherein the pin extends from the stabiliser plate to beyond the inlet of the gas outlet conduit.

5. A gas-solids separator according to claim 4, wherein the pin is fixed within the gas outlet conduit by means of supporting means, said supporting means are swirl means which swirl means are positioned such that they decrease the swirling motion of the gas being discharged via the gas outlet conduit.

6. A gas-solids separator according to claim 1, wherein the inner diameter of the passageway contains a restriction.

7. A gas-solids separator according to claim 1, wherein the inlet for introducing the gas-solids mixture is arranged tangentially to the tubular housing.

8. A gas-solids separator according to claim 7, wherein the co-axially positioned tubular gas outlet conduit and tubular housing define an annulus for receiving the gas-solids mixture and which is provided with swirl-imparting means.

9. A separating device, comprising: a vessel; a general gas inlet; a general gas outlet and a general solids outlet; wherein the vessel has been provided with an upper tube sheet and a lower tube sheet, the two tube sheets defining an upper space in fluid communication with the general gas outlet; a gas-tight middle space in fluid communication with the general gas inlet and a lower space in fluid communication with the general solids outlet; wherein a gas-solids separator comprising a tubular housing; an inlet for introducing a gas-solids mixture at one end of said housing, which inlet is executed such that it imparts a swirl to the gas-solids mixture; a solids outlet opening at the opposite end of said housing; and a co-axially positioned tubular gas outlet conduit having a gas outlet conduit inlet end and extending through an end of said housing with the gas outlet conduit inlet terminating within a separator zone defined by the tubular housing; a vortex stabiliser, comprising a pin placed on a stabilising plate, residing within the separator zone wherein the pin runs along an axis of the tubular housing and in which a passageway is provided through the stabiliser plate and the pin has been arranged such that the inlet of the gas-solids separator is in fluid communication with the middle space, the solids outlet opening of the gas-solids separator is in fluid communication with the lower space, and the tubular gas outlet conduit of the gas-solids separator is in fluid communication with the upper space.

10. A separating device according to claim 9, wherein the pin is present along at least 20% of the axis of the tubular housing, said axis running from the gas outlet conduit end inlet of the gas outlet conduit up to the stabiliser plate.

11. A separating device according to claim 10, wherein the pin is present along at from 30 to 100% of the axis of the tubular housing.

12. A separating device according to claim 11, wherein the pin extends from the stabiliser plate to beyond the inlet of the gas outlet conduit.

13. A separating device according to claim 12, wherein the pin is fixed within the gas outlet conduit by means of supporting means, said supporting means are swirl means which swirl means are positioned such that they decrease the swirling motion of the gas being discharged via the gas outlet conduit.

14. A separating device according to claim 9, wherein the inner diameter of the passageway contains a restriction.

15. A separating device according to claim 9, wherein the inlet for introducing the gas-solids mixture is arranged tangentially to the tubular housing.

16. A separating device according to claim 9, wherein the inlet for introducing the gas-solids mixture is arranged co-axially in the tubular housing and has been provided with swirl-imparting means.

* * * * *